United States Patent
Yoon

(10) Patent No.: US 9,868,444 B2
(45) Date of Patent: Jan. 16, 2018

(54) CONTROL METHOD OF VEHICLE

(71) Applicant: HYUNDAI MOTOR COMPANY, Seoul (KR)

(72) Inventor: Young Min Yoon, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 66 days.

(21) Appl. No.: 15/053,739

(22) Filed: Feb. 25, 2016

(65) Prior Publication Data
US 2017/0120913 A1 May 4, 2017

(30) Foreign Application Priority Data
Nov. 3, 2015 (KR) .................. 10-2015-0154141

(51) Int. Cl.
| | |
|---|---|
| *B60W 10/06* | (2006.01) |
| *B60W 10/113* | (2012.01) |
| *B60W 30/18* | (2012.01) |
| *B60W 30/188* | (2012.01) |
| *B60W 10/11* | (2012.01) |
| *B60W 50/00* | (2006.01) |
| *B60W 30/186* | (2012.01) |
| *F16H 59/20* | (2006.01) |

(52) U.S. Cl.
CPC ......... *B60W 30/188* (2013.01); *B60W 10/06* (2013.01); *B60W 10/11* (2013.01); *B60W 30/186* (2013.01); *B60W 50/00* (2013.01); *F16H 59/20* (2013.01); *B60W 2050/0026* (2013.01); *B60W 2520/10* (2013.01); *B60W 2540/103* (2013.01); *B60W 2710/0644* (2013.01); *B60W 2710/1005* (2013.01)

(58) Field of Classification Search
CPC .... B60W 10/06; B60W 10/11; B60W 10/113; B60W 2520/10; B60W 2540/103; B60W 2710/0644; B60W 2710/1005
See application file for complete search history.

(56) References Cited

U.S. PATENT DOCUMENTS

| | | | |
|---|---|---|---|
| 7,933,706 B2 * | 4/2011 | Ikeda | F16H 59/72 477/144 |
| 2016/0084375 A1 * | 3/2016 | Yoon | F16H 61/0213 701/55 |
| 2017/0043779 A1 * | 2/2017 | Yoon | B60W 30/1843 |

(Continued)

FOREIGN PATENT DOCUMENTS

| | | |
|---|---|---|
| JP | H03-125030 A | 5/1991 |
| JP | 2006-132562 A | 5/2006 |
| JP | 2000-104824 A | 4/2011 |

(Continued)

*Primary Examiner* — Ramya Burgess
*Assistant Examiner* — David Morris
(74) *Attorney, Agent, or Firm* — McDermott Will & Emery LLP

(57) ABSTRACT

A control method of a vehicle includes summing weight values according to shift types through a controller during kickdown shifts of the vehicle, calculating a control constant based on the acquired sum of the weight values and the number of times of kickdown shifting through the controller, after summing of the weight values, and adjusting at least one of a shift pattern and an engine RPM based on the calculated control constant through the controller, after the calculation of the control constant.

8 Claims, 3 Drawing Sheets

(56) References Cited

U.S. PATENT DOCUMENTS

2017/0088137 A1* 3/2017 Yoon .................... B60W 10/06

FOREIGN PATENT DOCUMENTS

| KR | 10-1999-0047660 A | 7/1999 |
| KR | 10-2004-0001774 A | 1/2004 |
| KR | 10-2009-0053998 A | 5/2009 |
| KR | 10-2010-0101813 A | 9/2010 |

* cited by examiner

| ONE-POSITION SKIP SHIFT | 2 → 1 | 3 → 2 | 4 → 3 | 5 → 4 | 6 → 5 | 7 → 6 |
|---|---|---|---|---|---|---|
| WEIGH VALUE | 3 | 2 | 1 | 1 | 1 | 1 |
| TWO-POSITION SKIP SHIFT | 3 → 1 | 4 → 2 | 5 → 3 | 6 → 4 | 7 → 5 | |
| WEIGH VALUE | 4 | 3 | 2 | 2 | 2 | |
| THREE-POSITION SKIP SHIFT | 4 → 1 | 5 → 2 | 6 → 3 | 7 → 4 | | |
| WEIGH VALUE | 5 | 4 | 3 | 3 | | |
| FOUR-POSITION SKIP SHIFT | 5 → 1 | 6 → 2 | 7 → 3 | | | |
| WEIGH VALUE | 6 | 5 | 4 | | | |
| FIVE-POSITION SKIP SHIFT | 6 → 1 | 7 → 2 | | | | |
| WEIGH VALUE | 7 | 6 | | | | |

CONTROL METHOD OF VEHICLE

CROSS-REFERENCE TO RELATED APPLICATION

This application claims the benefit of priority to Korean Patent Application No. 10-2015-0154141, filed on Nov. 3, 2015 with the Korean Intellectual Property Office, the disclosure of which is incorporated herein by reference.

TECHNICAL FIELD

The present disclosure relates to a control method of a vehicle, and more particularly to a control method of a vehicle in which a severity degree of a clutch is estimated based on kickdown shift conditions of the vehicle.

BACKGROUND

In general, a dual clutch transmission (DCT) is a type of automatic transmission system which transmits engine torque using dry clutches in a different manner from a conventional automatic transmission with a torque converter and a wet multiple disk clutch. The dry clutch is difficult to cool during heat generation and, when a temperature rises, has remarkably lowered friction performance which can cause difficulty in transmitting power. Simultaneously, when the clutch continues to slip, fade out of the clutch is generated, and the clutch may malfunction.

Thus, when the clutch is raised to a specific temperature or more, functions to protect the clutch are operated. However, since these functions are operated so as to restrict the driving performance of the vehicle, activating a control to prevent the vehicle from entering a clutch high temperature mode is required.

Therefore, a method in which a driver's driving tendency and road conditions on which the driver mainly drives are judged, a severity degree of a clutch is estimated, and the clutch is controlled based on durability and reliability of the clutch may be employed so as to prevent overheating of the clutch.

The above description has been provided to aid in understanding of the background of the present disclosure and should not be interpreted as conventional technology known to those skilled in the art.

SUMMARY OF THE DISCLOSURE

Therefore, the present disclosure has been made in view of the above problems, and it is an object of the present disclosure to provide a control method of a vehicle in which a control constant indicating a severity degree of a clutch is calculated based on kickdown shift types of the vehicle and the vehicle is controlled according to the control constant so as to prevent overheating of the clutch.

In accordance with the present disclosure, the above and other objects can be accomplished by the provision of a control method of a vehicle including summing weight values according to shift types through a controller during kickdown shifts of the vehicle, calculating a control constant based on the acquired sum of the weight values and the number of times of kickdown shifts through the controller, after summing of the weight values, and adjusting at least one of a shift pattern and an engine RPM based on the calculated control constant through the controller, after the calculation of the control constant.

In summing of the weight values, the controller may set a larger weight value as a shift type has a smaller ordinal number of a target gear position.

In summing of the weight values, the controller may set a larger weight value as a shift type has a larger difference between the ordinal number of a target gear position and the ordinal number of a current gear position.

In calculation of the control constant, the controller may calculate the control constant by dividing the acquired sum of the weight values by the number of times of kickdown shift.

The acquired sum of the weight values may be the sum of weight values according to all kickdown shifts generated up to now and the number of times of kickdown shift may be the number of times of all kickdown shifts generated up to now.

In adjustment of at least one of the shift pattern and the engine RPM, the controller may adjust an upshift pattern so that, as the control constant increases, upshift is executed at a higher vehicle speed than an existing shift pattern.

In adjustment of at least one of the shift pattern and the engine RPM, the controller may adjust a downshift pattern so that, as the control constant increases, downshift is executed at a lower vehicle speed than an existing shift pattern.

In adjustment of at least one of the shift pattern and the engine RPM, the controller may adjust the engine RPM so as to be lower than an existing engine RPM as the control constant increases.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

Figure 1:
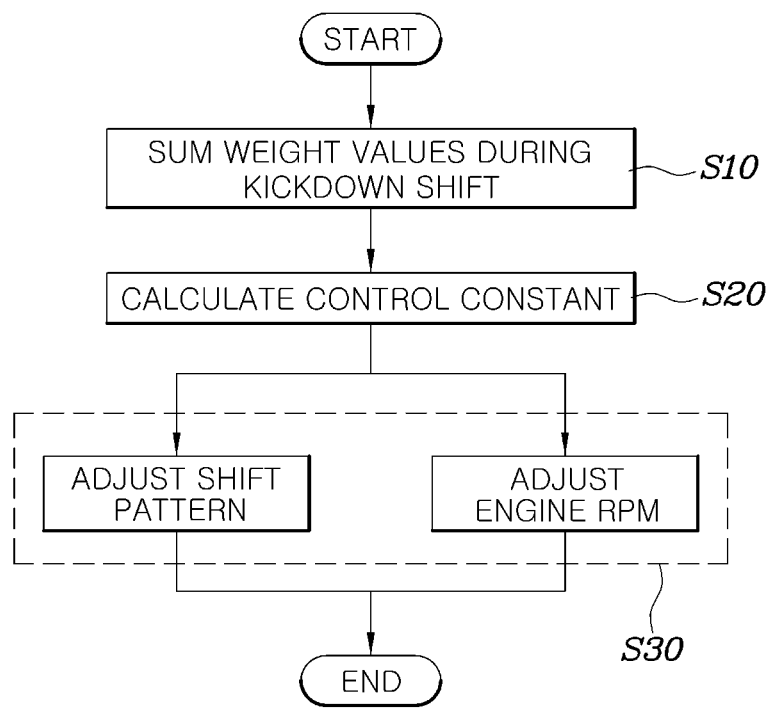
FIG. 1 is a flowchart illustrating a control method of a vehicle in accordance with one embodiment of the present disclosure.
Figures 2, 3:
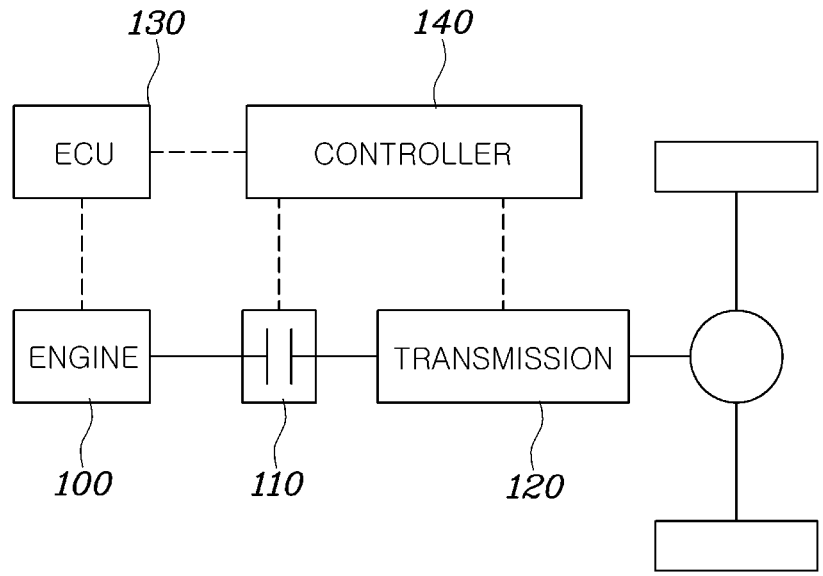
FIG. 2 is a block diagram illustrating a control apparatus of a vehicle in accordance with one embodiment of the present disclosure.
FIG. 3 is a table providing weight values according to shift types in accordance with one embodiment of the present disclosure.

FIG. 1 is a flowchart illustrating a control method of a vehicle in accordance with one embodiment of the present disclosure and FIG. 2 is a block diagram illustrating a control apparatus of a vehicle in accordance with one embodiment of the present disclosure. With reference to FIGS. 1 and 2, a control method of a vehicle may include summing weight values according to shift types through a controller 140 during kickdown shift of the vehicle (Operation S10), calculating a control constant based on the acquired sum of the weight values and the number of times of kickdown shift through the controller 140 (Operation S20) after summing of the weight values (Operation S10), and adjusting at least one of a shift pattern and an engine RPM based on the control constant through the controller 140 (Operation S30) after calculation of the control constant (Operation S20).

If a driver mainly drives a vehicle downtown and has a driving tendency to execute abrupt accelerations and decelerations, there is a high possibility of overheating a clutch 110 between an engine 100 and a transmission 120 due to frequent slip. On the other hand, if a driver mainly drives a vehicle on the expressway or has a driving tendency to pursue fuel-efficient driving, there is a low possibility of overheating the clutch 110.

Therefore, in order to acquire a driver's driving tendency or information of a road on which the driver mainly drives a vehicle, the controller 140 senses a shift type when kickdown shift of the vehicle is carried out. Here, since the controller 140 is provided to sense the shift type of the vehicle and then to adjust the shift pattern of the vehicle thereafter, the controller 140 may be a transmission control unit (TCU).

The control constant calculated in a calculation of the control constant (Operation S20) may be an index indicating a degree of severe environments which the clutch 110 encounters according to the driver's driving tendency and the driving road.

By using the control constant as an index indicating the severity degree of the clutch 110 and adjusting at least one of the shift pattern or the engine RPM of the vehicle based on the control constant, as described above, preparations for clutch overheating conditions may be made. A detailed description of the control method will be given below.

In summing of the weight values (Operation S10), the controller 140 may set a larger weight value as the shift type has a smaller ordinal number of a target gear position.

For example, if the driver mainly drives the vehicle in low-speed conditions, such as downtown, there is a high possibility of overheating the clutch 110 due to frequent shifting. On the other hand, if the driver mainly drives the vehicle on the expressway, shifting is not frequently carried out, as compared to in the low-speed conditions, and there is a low possibility of overheating the clutch 110.

Therefore, in order to recognize road conditions on which the vehicle is mainly driven, the ordinal number of a target gear position in kickdown shift is sensed. If the sensed ordinal number of the target gear position is small, the vehicle is in the low-speed driving conditions, there is a high possibility that the clutch 110 will encounter severe environments and, thus, the weight value to be summed may be set to be large. On the other hand, if the sensed ordinal number of the target gear position is large, the vehicle is in the high-speed driving conditions, there is a smaller possibility of overheating the clutch 110 than in the low-speed driving conditions and, thus, the weight value to be summed may be set to be smaller than the weight value set if the ordinal number of the target gear position is small. Thereby, the weight value may be prepared so as to reflect the road conditions on which the vehicle is mainly driven.

Further, in summing of the weight values (Operation S10), as the shift type has a larger difference between the ordinal number of the target gear position and the ordinal number of the current gear position, the controller 140 may set a larger weight value.

If the driver executes abrupt acceleration or deceleration during driving of the vehicle, the controller 140 may execute kickdown skip shift. Kickdown skip shift does not mean sequential shift to a target gear position but means shifting to the target gear position at once, if the open value of an accelerator position sensor (APS) of the vehicle is rapidly increased as compared to the vehicle speed and thus a kickdown shift needs to be executed a plurality of times according to a shift pattern. Therefore, as acceleration of the vehicle is more strongly executed, the number of shift positions which are skipped through kickdown skip shifts increases.

Consequently, during kickdown shifting, as a difference of ordinal numbers between the current gear position and the target gear position increases, the number of shift positions which are skipped increases, it is judged that the driver has an aggressive driving tendency and, thus, a larger weight value than the weight value set if the number of shift positions which are skipped is small may be set. Therefore, the weight value may be provided to reflect the driver's driving tendency.

FIG. 3 is a table stating weight values according to shift types in accordance with one embodiment of the present disclosure. With reference to FIG. 3, it may be understood that a weight value to be summed becomes larger as the ordinal number of the target gear position during kickdown shift decreases and becomes larger as the number of skipped shift positions increases. However, the weight values stated in FIG. 3 are set only for one embodiment and may be changed by vehicles or designers.

In calculation of the control constant (Operation S20), the control constant is calculated by dividing the acquired sum of the weight values by the number of times of kickdown shifting.

That is, the control constant may be set to be in direct proportion to the sum of weight values in which the driver's driving tendency and the road conditions are reflected and in inverse proportion to the number of times of kickdown shifts and thus indicate an average severity degree of the clutch 110 of the vehicle. Therefore, it may be judged that, as the calculated control constant increases, the clutch 110 is in severe conditions due to the driver's driving tendency and road conditions and, as the calculated control constant decreases, the clutch 110 is in mild conditions.

In the present disclosure, the acquired sum of the weight values may be the sum of weight values according to all kickdown shifts generated up to now and the number of times of kickdown shifts may be the number of times of all kickdown shifts generated up to now.

That is, if the vehicle is driving, the severity degree of the clutch 110 in a short term may be judged by calculating the control constant based on weight values and the number of times of kickdown shift from turning-on of the vehicle up to a present time, or 'now.' However, in order to judge the severity degree of the clutch 110 in a long term, the controller 140, even if the vehicle is turned off, may calculate the control constant by storing weight values and the number of times of kickdown shifts, acquired during former driving, and then adding the stored values to weight values and the number of times of kickdown shift acquired during subsequent driving.

For example, reliability of the control constant may be improved by executing adjustment of at least one of the shift pattern or the engine RPM (Operation S30) only if the number of times of kickdown shift is 100 or more. However, since the above number of times of kickdown shift is only exemplary, it may be varied according to vehicles or designers and is not limited to a specific value.

In the present disclosure, in adjustment of at least one of the shift pattern or the engine RPM (Operation S30), the controller 140 may adjust an upshift pattern so that, as the control constant increases, an upshift is executed at a higher vehicle speed than an existing shift pattern.

That is, as the control constant increases, a point of time when a shift is executed becomes later even if the vehicle speed increases and, thus, an upshift is not rapidly executed even if the vehicle speed increases. Thus, overheating of the clutch 110 caused by an increase of the slip amount of the clutch 110 due to frequent generation of upshifts may be prevented.

Figure 4:
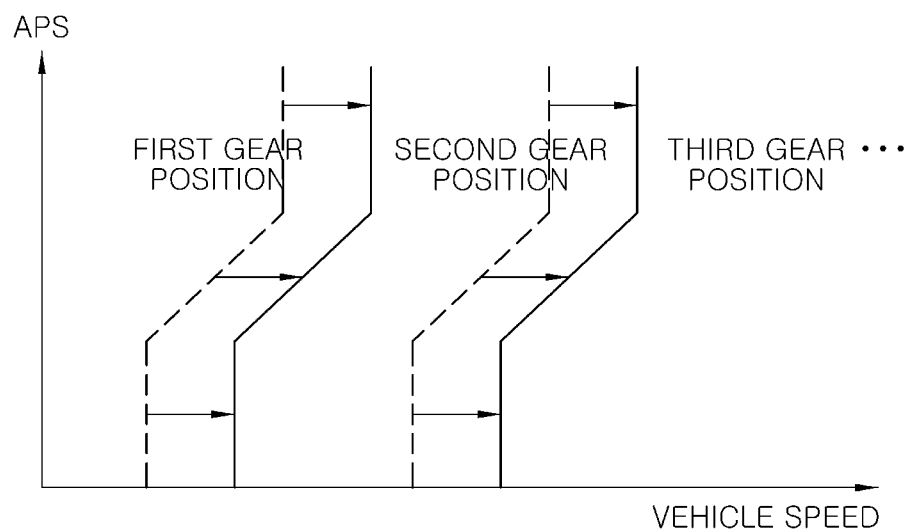
FIG. 4 is a graph illustrating adjustments of shift patterns in accordance with one embodiment of the present disclosure.

FIG. 4 is a graph illustrating adjustments of shift patterns in accordance with one embodiment of the present disclosure, a shift pattern shown by a dotted line means an existing shift pattern and a shift pattern shown by a solid line means an adjusted shift pattern. It may be understood that, as the control constant increases, shift patterns are adjusted in a direction toward a higher vehicle speed, i.e., a shift pattern to upshift from a first gear position to a second gear position and a shift pattern to upshift from a second gear position to a third gear position are adjusted in the higher vehicle speed direction. In addition, other upshift patterns, which are not shown, may also be adjusted in the higher vehicle speed direction.

Further, in an adjustment of at least one of the shift pattern or the engine RPM (Operation S30), the controller 140 may adjust a downshift pattern so that, as the control constant increases, a downshift is executed at a lower vehicle speed than would be according to the existing shift pattern.

That is, as the control constant increases, the frequency of abrupt acceleration and deceleration of the vehicle by the driver is large and, thus, driving of the engine in a high torque state is advantageous. For example, when the driver abruptly accelerates or decelerates the vehicle, the open value of the APS and the vehicle speed increase and kickdown shifts to a low shift position may be generated. However, when a downshift pattern is adjusted in such a manner, the number of times of kickdown shifts may be reduced and overheating of the clutch 110 may be reduced by reduction of the slip amount of the clutch 110 due to kickdown shifting.

Therefore, as the control constant increases, upshift and downshift patterns may be adjusted according to vehicle speeds, as described above, thus minimizing overheating of the clutch 110 due to slip of the clutch 110 in severe environments.

Further, in adjustment of at least one of the shift pattern or the engine RPM (Operation S30), the controller 140 may adjust the engine RPM so as to be lower than an existing engine RPM as the control constant increases. Here, the controller 140 may control the engine RPM through an engine control unit (ECU) 130.

Figure 5:
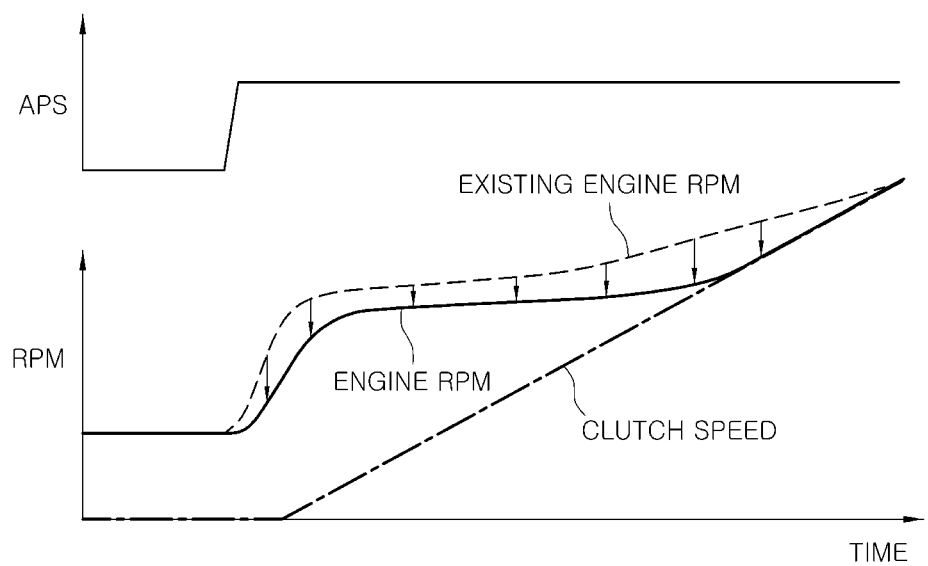
FIG. 5 is a graph illustrating adjustments of an engine RPM in accordance with one embodiment of the present disclosure.

FIG. 5 is a graph illustrating adjustments of an engine RPM in accordance with one embodiment of the present disclosure. With reference to FIG. 5, as the open value of the APS increases, both the engine RPM and the clutch speed increase. In the graph shown in FIG. 5, an area between an engine RPM line and a clutch speed line may correspond to a slip amount.

That is, as the control constant increases, an engine RPM is lowered from the existing engine RPM so as to reduce a speed difference with the clutch speed and to cause the engine RPM and the clutch speed to meet within a short time, thus minimizing the slip amount of the clutch 110. Thereby, heat generated from the clutch 110 may be minimized.

As is apparent from the above description, in a control method of a vehicle in accordance with one embodiment of the present disclosure, a shift pattern of the vehicle or an engine RPM may be adjusted according to a driver's driving tendency or road conditions, thereby preventing or reducing overheating of a clutch and thus improving durability and reliability of the clutch.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A control method of a vehicle, the control method comprising:
   summing weight values according to a shift type through a controller during kickdown shifts of the vehicle;
   calculating a control constant based on the acquired sum of the weight values and a number of times of kickdown shifting through the controller, after summing of the weight values; and
   adjusting at least one of a shift pattern and an engine RPM based on the calculated control constant through the controller, after the calculation of the control constant.

2. The control method according to claim 1, wherein, in the step of summing the weight values, the controller sums a larger weight value as the shift type has a lower level of a target gear position.

3. The control method according to claim 1, wherein, in the step of summing the weight values, the controller sums a larger weight value as the shift type has a larger difference between a level of a target gear position and a level of a current gear position.

4. The control method according to claim 1, wherein, in the step of calculation of the control constant, the controller calculates the control constant by dividing the acquired sum of the weight values by the number of times of kickdown shifts.

5. The control method according to claim 1, wherein:
   the acquired sum of the weight values is the sum of weight values according to all kickdown shifts generated up to a current time; and
   the number of times of kickdown shifts is the number of times of all kickdown shifts generated up to the current time.

6. The control method according to claim 1, wherein, in the step of adjustment of at least one of the shift pattern and the engine RPM, the controller adjusts an upshift pattern so that, as the control constant increases, an upshift is executed at a higher vehicle speed than would be executed in an existing shift pattern.

7. The control method according to claim 1, wherein, in the step of adjustment of at least one of the shift pattern and the engine RPM, the controller adjusts a downshift pattern so that, as the control constant increases, a downshift is executed at a lower vehicle speed than would be executed in an existing shift pattern.

8. The control method according to claim 1, wherein, in the step of adjustment of at least one of the shift pattern and the engine RPM, the controller adjusts the engine RPM so as to be lower than an existing engine RPM as the control constant increases.

* * * * *